United States Patent
Thomas et al.

(10) Patent No.: US 12,445,202 B2
(45) Date of Patent: Oct. 14, 2025

(54) GAIN AND TARGET AMPLITUDE TUNING IN A RECEIVER

(71) Applicant: HEWLETT PACKARD ENTERPRISE DEVELOPMENT LP, Houston, TX (US)

(72) Inventors: David Ritter Thomas, Fort Collins, CO (US); Kit MacCarthy Morton, Fort Collins, CO (US); Michael Alex Schroeder, Plano, TX (US); Mauricio Madiedo, Fort Collins, CO (US); Leah Rozewski, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 885 days.

(21) Appl. No.: 17/694,021

(22) Filed: Mar. 14, 2022

(65) Prior Publication Data
US 2023/0291475 A1    Sep. 14, 2023

(51) Int. Cl.
*H04B 10/294* (2013.01)
*H04B 10/50* (2013.01)
*H04B 10/69* (2013.01)

(52) U.S. Cl.
CPC ..... *H04B 10/2942* (2013.01); *H04B 10/2941* (2013.01); *H04B 10/50572* (2013.01); *H04B 10/6931* (2013.01)

(58) Field of Classification Search
None
See application file for complete search history.

(56) References Cited

U.S. PATENT DOCUMENTS

| | | | |
|---|---|---|---|
| 5,812,710 A * | 9/1998 | Sugaya | H04B 10/2941 385/27 |
| 8,027,409 B2 | 9/2011 | Aziz et al. | |
| 9,413,524 B1 | 8/2016 | Xu et al. | |
| 9,438,409 B1 | 9/2016 | Liao et al. | |
| 9,595,990 B1 | 3/2017 | Zhang et al. | |
| 9,654,327 B2 | 5/2017 | Liao et al. | |
| 9,847,839 B2 | 12/2017 | Gopalakrishnan et al. | |
| 10,142,089 B2 | 11/2018 | Yao et al. | |
| 10,367,666 B2 | 7/2019 | Zhang et al. | |
| 2002/0191275 A1* | 12/2002 | Kinoshita | H01S 3/13013 359/337.5 |

(Continued)

*Primary Examiner* — Darren E Wolf
(74) *Attorney, Agent, or Firm* — Hewlett Packard Enterprise Patent Department

(57) ABSTRACT

Examples described herein relate to a receiver training method. To configure a static gain for at least one static gain amplifier and a target amplitude for a dynamic gain amplifier, a dynamic gain adjustment is disabled and the dynamic gain amplifier is configured to apply a predetermined fixed gain to the static gain amplified signal to generate a test signal. Furthermore, an effective static gain magnitude for at least one static gain amplifier and an effective amplitude for the test signal are determined based on a link performance metric. The static gain is set to the effective static gain magnitude, and a target amplitude for the dynamic gain amplifier is set to the effective amplitude. Then, the dynamic gain adjustment may be enabled to maintain an amplitude of a dynamic gain amplified signal at an output of the dynamic gain amplifier at the target amplitude by varying the dynamic gain.

20 Claims, 5 Drawing Sheets

(56) References Cited

U.S. PATENT DOCUMENTS

| | | | |
|---|---|---|---|
| 2004/0033004 A1* | 2/2004 | Welch | H01S 5/22 |
| | | | 385/14 |
| 2005/0111848 A1* | 5/2005 | Grubb | H04B 10/25133 |
| | | | 398/147 |
| 2011/0019995 A1* | 1/2011 | Suzuki | H04B 10/275 |
| | | | 398/45 |
| 2016/0218734 A1 | 7/2016 | Malipatil et al. | |
| 2020/0252247 A1 | 8/2020 | Palusa et al. | |

* cited by examiner

GAIN AND TARGET AMPLITUDE TUNING IN A RECEIVER

BACKGROUND

Optical systems include optical devices that can generate, process, and/or carry optical signals from one point to another point. In certain implementations, optical systems such as optical communication systems may facilitate data communication over longer distances with higher bandwidth using smaller cable width (or diameter) in comparison to communication systems using electrical wires. In an optical communication system, light may be generated by a light source such as a laser. The light may be modulated and/or encoded by an optoelectronic transmitter, transmitted over an optical communication link, and demodulated and/or decoded by an optoelectronic receiver that includes photosensitive devices, for example. Transmission of data signals via the communication link commonly suffers from undesirable signal impairments (e.g., attenuation, noise, etc.) that deteriorate the quality of the data signals.

BRIEF DESCRIPTION OF THE DRAWINGS

Various examples will be described below with references to the following figures.

Figure 1:
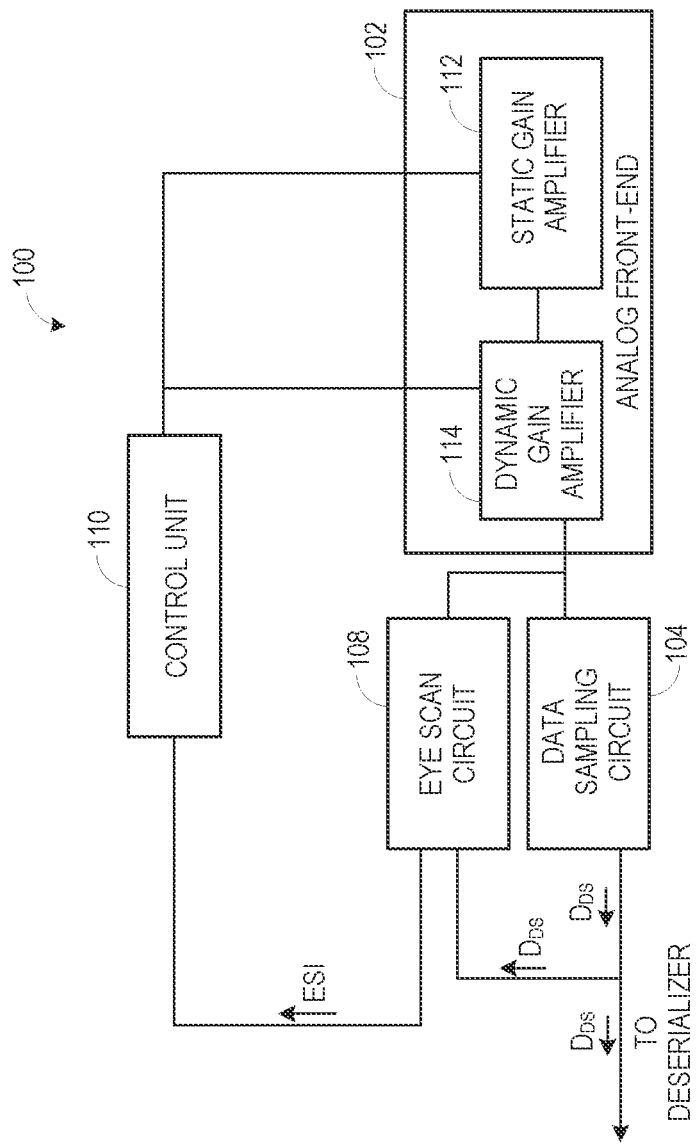
FIG. 1 is a block diagram of an example receiver.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Data may be communicated across an optical communication link, e.g., an optical fiber in the case of an optical communication system. Generally, optoelectronic transmitters may be configured to convert electrical impulses into optical signals, which may then be received by optoelectronic receivers over the optical communication links and converted back into electrical pulses to enable data sampling. Optical communication links may be used within computing devices, for example, to implement a systems bus, and/or to network different computing devices.

Optical signals received at an optoelectronic receiver (also referred to as "receiver" hereinafter) in computing systems often differ from a transmitted signal due to signal impairments such as attenuation, distortion, and noise. Such signal impairments may cause various changes that degrade the quality of the optical signals and the overall performance of the receiver. The performance of a communication device such as the receiver can be measured in terms of Bit Error Rate (BER) which represents the ability of the communication device to pass bits without errors. Generally, high-speed communication systems tend to have higher BER. In particular, for high-speed optical communication systems utilizing multi-level pulse-amplitude modulation (PAM) (e.g., PAM4) signals, these signal impairments may be more prominent due to high data rates and cause an increase in the BER.

Some receivers use an analog front-end (AFE), which is a circuit that enhances received signal quality. The AFE may include signal amplifiers such as static gain amplifiers and dynamic gain amplifiers to output a signal at a desired amplitude. Gains of such signal amplifiers are tuned to achieve a target signal amplitude at the output of the AFE. In some existing approaches to AFE tuning, the target signal amplitude is first set such that receiver noise is controlled and the linearity of the signal through the AFE is maintained as the received signal is processed. Next, static gains of the static gain amplifiers are adjusted to manage receiver thermal headroom. Thermal headroom, in this context, refers to a range of operating temperature values over which the receiver can maintain the BER below a predetermined value. However, in situations with increased variations in the input signal amplitude, the gain of the AFE may not be able to maintain its output at the target signal amplitude. Such variations may arise due to manufacturing variations, channel variations, and/or other reasons. Due to such AFE output variations, downstream processing circuitry such as sampling circuitry may erroneously decode incoming signals. This creates a risk that receiver BER will increase. Temperature variations can also cause erroneous decoding, also increasing receiver BER.

In accordance with one or more examples presented herein, an enhanced receiver training method for tuning a static gain of at least one static gain amplifier and a target amplitude for a dynamic gain amplifier of an example receiver is presented. The proposed receiver training method may be performed during a training phase of the receiver. The receiver comprises at least one static gain amplifier to generate a static gain amplified signal. The static gain amplifier is coupled to an input of a dynamic gain amplifier. To configure the static gain and the target amplitude, the control unit first disables a dynamic gain adjustment via the dynamic gain amplifier. Next, the control unit configures the dynamic gain amplifier to apply a predetermined fixed gain to the static gain amplified signal to generate a test signal. A control unit determines an effective static gain magnitude of at least one static gain amplifier and an effective amplitude of the test signal for which a link performance metric of the receiver is identified to be at a target performance value. The link performance metric may be indicative of a BER of the receiver and is determined by the control unit. In some examples, a higher value of the link performance metric may be indicative of reduced BER, and vice-versa. The control unit sets the static gain of at least one static gain amplifier to the effective static gain magnitude, and sets a target amplitude for the dynamic gain amplifier to the effective test signal amplitude. In particular, the control unit may adjust the static gain of the static gain amplifier and set the target amplitude for the AFE output voltage such that the link performance metric attains a maximum value resulting in minimum BER. Then, the control unit also enables the dynamic gain adjustment via the dynamic gain amplifier to maintain an amplitude of a dynamic gain amplified signal at an output of the dynamic gain amplifier at the target amplitude by varying the dynamic gain.

The presented receiver training method aids in reducing the adverse impacts of signal variation, reducing BER and increasing thermal headroom for the receiver. The proposed method achieves this at least in part by temporarily configuring the dynamic gain amplifier to behave as a fixed/static gain amplifier during a training phase to configure the static gain amplifier(s). In one example, the predetermined fixed gain may be selected to be a middle value of a dynamic gain range (e.g., the range between a minimum and maximum gain magnitude of the dynamic gain amplifier) and the effective static gain magnitude of the at least one static gain amplifier is determined while maintaining the dynamic gain at that middle value. In particular, the effective static gain magnitude of the at least one static gain amplifier and the target amplitude of the test signal are selected such that the link performance metric of the receiver achieves a target performance value (e.g., maximum value) resulting in reduced BER.

When the static gain of at least one static gain amplifier is set to the effective static gain magnitude, and the target amplitude for the dynamic gain amplifier is set to the effective amplitude, the dynamic gain adjustment is reenabled. In particular, the dynamic gain adjustment is reenabled, while the dynamic gain is set to the predetermined fixed gain. Accordingly, during runtime after the dynamic gain adjustment is reenabled, the dynamic gain amplifier is configured to maintain an amplitude of the dynamic gain amplified signal at the target amplitude by varying the dynamic gain around the predetermined fixed gain. Because the predetermined fixed gain is set to the middle value of the dynamic gain range, the dynamic gain can be varied through the full dynamic gain range during the run time of the receiver to compensate for signal variations. Because the dynamic gain amplifier has the full dynamic gain range available to compensate for any signal variations, the receiver's capacity of withstanding temperature variations also increases. This results in increased receiver thermal headroom. With the increase in the thermal headroom, the BER of the receiver also decreases.

Referring now to the drawings, FIG. 1 depicts an example receiver 100. The receiver 100 may be an optoelectronic or electronic receiver, and which may be a stand-alone receiver or be part of a transceiver. In some examples, the receiver 100 may be a serializer/deserializer (SERDES) receiver that includes a deserializer circuit of the SERDES that converts a stream of bits (e.g., at an output of a data sampling circuit—described later) into a plurality of parallel bitstreams. In the implementation of FIG. 1, the receiver 100 is shown to include an AFE 102, a data sampling circuit 104, an eye scan circuit 108, and a control unit 110. The data sampling circuit 104 and the eye scan circuit 108 are coupled to the AFE 102 to receive output (e.g., signal voltage) generated by the AFE 102. The control unit 110 is coupled to the AFE 102, the data sampling circuit 104, and the eye scan circuit 108 to control operations thereof.

The AFE 102 may receive an input signal via a receiver input pad (not shown in FIG. 1) from outside of the receiver 100. The receiver 100 may be an optoelectronic receiver. The receiver input pad may include one or more photodiodes that detect light (i.e., optical signal) that is transmitted over an optical communication link (not shown), such as a fiber optic cable. The photodiodes convert the optical signal received over the optical communication link into an electrical signal which is the input signal. The input signal may be a multi-level Pulse Amplitude Modulation (PAM) signal. In the description hereinafter, for illustration purposes, the input signal is described as being a Pulse Amplitude Modulation 4-level (PAM4) signal.

The AFE 102 may include analog circuits to condition the input signal by reducing distortion and amplifying the input signal. In some examples, the AFE 102 may include circuits, such as, one or more signal amplifiers, signal equalizers, current-to-voltage converters, single-ended to differential voltage converters, or combinations thereof. Not all of these are shown in FIG. 1. In the example of FIG. 1, for illustration purposes, the receiver 100 is shown to include signal amplification circuits, such as a static gain amplifier 112 and a dynamic gain amplifier 114. The static gain amplifier 112 and the dynamic gain amplifier 114 may be implemented as signal amplifiers using operational amplifiers (OPAMPs) and/or a circuit combination of electronic devices that provide gain to the received input signal, for example. The static gain amplifier 112 may amplify the input signal by providing a set gain to the input signal. The gain that the static gain amplifier 112 provides is hereinafter referred to as a static gain. In particular, the static gain amplifier 112 is configured to maintain its gain to a fixed value during the operation of the receiver 100 once set during a training phase (described later).

The dynamic gain amplifier 114 adjusts its gain (hereafter referred to as a dynamic gain) so as to generate an output signal having a target amplitude as indicated by the eye scan circuit 108. The output signal of the dynamic gain amplifier 114 may be a current signal or a voltage signal. For illustration purposes in the description hereinafter, the output signal of the dynamic gain amplifier 114 is described as being a voltage signal and is referred to as an output voltage of the dynamic gain amplifier 114 or AFE output voltage. The AFE output voltage may be a single-ended or a differential voltage. In the description hereinafter, the terms "AFE output voltage" should be understood to mean the output voltage of the dynamic gain amplifier 114.

During operation, the static gain amplifier 112 may amplify the input signal by providing the static gain. A signal (e.g., a voltage signal) appearing at the output of the static gain amplifier 112 during the training phase is hereinafter referred to as the static gain amplified signal. The control unit 110 may control a magnitude of the static gain by supplying a digital control value (e.g., a binary-encoded value) to the static gain amplifier 112. A range of static gain magnitudes to which the static gain of the static gain amplifier 112 can be set is hereinafter referred to as the static gain range. In one example, the static gain amplifier 112 may be configured to accept a 5-bit digital control value as a static gain control input (SGCI) resulting in 32 discrete settings through which the static gain may be set. Therefore, if the maximum magnitude of the static gain is 64 dB, the static gain of magnitude 64 dB can be varied in 32 discrete settings with the 5-bit digital control value. In one example, upon powering on the receiver 100, the static gain may be set to a baseline static gain magnitude. The baseline static gain magnitude may be a gain magnitude in the middle of the static gain range of 0 dB to 64 dB. In one example, the baseline static gain magnitude of 32 dB may be set by providing a 5-bit binary-encoded value of 10000 to the static gain amplifier 112.

The dynamic gain amplifier 114 is configured to provide finer control of gain as compared to the static gain amplifier 112. A magnitude of the dynamic gain of the dynamic gain amplifier 114 may be controlled by the control unit 110 by supplying a digital control value to the dynamic gain amplifier 114. A range of dynamic gain magnitudes to which the dynamic gain of the dynamic gain amplifier 114 can be set is hereinafter referred to as a dynamic gain range. In one example, the dynamic gain amplifier 114 may be configured to accept an 8-bit digital control value as a dynamic gain control input (DGCI) resulting in 256 discrete settings through which the dynamic gain may be set. Therefore, if the maximum magnitude of the dynamic gain is 16 dB, the dynamic gain of magnitude 16 dB can be varied in 256 discrete settings with the 8-bit digital control value. In one example, upon powering on the receiver 100, the dynamic gain may be set to a baseline dynamic gain magnitude. The baseline dynamic gain magnitude may be a middle value of the dynamic gain range of the dynamic gain amplifier 114. In one example, the baseline dynamic gain magnitude of 8 dB may be set by providing an 8-bit binary-encoded value of 10000000 to the dynamic gain amplifier 114.

In some examples, both the data sampling circuit 104 and the eye scan circuit 108 are coupled to the AFE 102 and receive the AFE output voltage. In some examples, the data sampling circuit 104 may be a single electronic circuit or a combination of a plurality of electronic circuits that may decode a data symbol (e.g., 00, 01, 10, 11, in the case of the PAM4 input signal) based on the AFE output voltage for each unit interval (UI). The eye scan circuit 108 may also include one or more circuits (e.g., a utility sampling circuit and an eye scan logic circuit, see FIG. 2) to generate eye scan information (ESI) that is representative of the distribution of the probability of the signal (e.g., the AFE output voltage) having given voltage value at a given phase offset. The given phase offset refers to a time offset between a time when the signal is sampled and a predefined point of the UI. The predefined point may be any of a beginning time, a middle time, or an end time of the UI.

The control unit 110 may be coupled to the AFE 102, the data sampling circuit 104, and the eye scan circuit 108. The control unit 110 may be implemented in the form of a microcontroller comprising one or more processors and a machine-readable storage medium that stores a processor-executable receiver training program code. The receiver training program code may include instructions which when executed by one or more processors of the microcontroller cause the microcontroller to set the static gain of the static gain amplifier 112 and the target amplitude of the output voltage of the dynamic gain amplifier 114. In another example, the control unit 110 may be implemented via one or more processors and a machine-readable storage medium storing the receiver training program code. In another example, the control unit 110 may be implemented via electronic circuits and devices, such as, but not limited to, digital logic circuits, digital subtractors, comparators, counters, and the like. In yet another example, the control unit 110 may be implemented in the form of an Application Specific Integrated Circuit (ASIC), system-on-chip (SOC), a Field Programmable Gate Array (FPGA), or the like. In the description hereinafter, several operations that are described as being performed by the control unit 110 may be performed using any or combinations of the implementations of the control unit 110 listed hereinabove.

In some examples, the static gain and the target amplitude for the output voltage of the dynamic gain amplifier 114 are configured during a training phase of the receiver 100. The training phase may commence upon powering on or resetting the receiver 100 and ends after the static gain and the target amplitude are set. In the training phase, the input signal may be a known test signal (e.g., a test PAM4 signal). During the training phase, the control unit 110 is configured to adjust the static gain of the static gain amplifier 112 and set the target amplitude for the AFE output voltage such that the link performance metric is at a target performance value. The link performance metric may be indicative of a BER of the receiver 100 and is determined by the control unit 110 based on the eye scan information received from the eye scan circuit 108. In particular, the control unit 110 may adjust the static gain of the static gain amplifier 112 and set the target amplitude for the AFE 102 output voltage such that the link performance metric attains a maximum value resulting in minimum BER. Details of calculating the link performance metric are described in conjunction with FIG. 5.

In some examples, the AFE 102 may be supplied with a known input signal, for example, a PAM-4 voltage signal with a predefined sequence of one or more of the four levels. The static gain amplifier 112 may amplify the input signal to generate a static gain amplified signal by applying a static gain (e.g., the baseline static gain magnitude) to an input signal. The dynamic gain amplifier 114 receives the static gain amplified signal. To further adjust the static gain of the static gain amplifier 112, the control unit 110 may first stop the dynamic gain amplifier from dynamically adjusting its gain. In particular, the control unit 110 may first disable a dynamic gain adjustment and then configure the dynamic gain amplifier 114 to apply a predetermined fixed gain to the static gain amplified signal to generate a test signal. When the dynamic gain adjustment is disabled, the dynamic gain amplifier 114 is temporarily configured to perform as a fixed/static gain amplifier that provides a fixed gain (e.g., a gain equal to a predetermined gain) to the received static gain amplified signal, thereby generating a test signal. The test signal is a voltage signal appearing at the output of the dynamic gain amplifier 114 when the dynamic gain amplifier 114 is configured to provide the predetermined fixed gain. In some examples, the predetermined fixed gain may be set to a value within a predetermined range (e.g., ±10%) from the middle value.

Once the dynamic gain adjustment is disabled and the dynamic gain amplifier 114 is configured to provide the predetermined fixed gain, the control unit 110 may determine an effective static gain magnitude for the static gain amplifier 112 and an effective amplitude of the test signal for which the link performance metric of the receiver 100 is identified to be at the target performance value. In one example, the effective static gain magnitude and the effective amplitude of the test signal represent the values of the static gain and the amplitude of the test signal for which the value of the link performance metric is determined to be maximum. In some examples, to determine the effective static gain magnitude and the effective amplitude of the test signal, the control unit 110 may sweep the static gain through the range of static gain magnitudes and for each value of the static gain, measure the amplitude of the test signal and calculate the link performance metric. The values for which the link performance metric is determined to be at the target performance value may be registered as the effective static gain magnitude and the effective amplitude of the test signal.

Further, the control unit 110 may set the static gain of the static gain amplifier 112 to the effective static gain magnitude. Also, the control unit 110 may set a target amplitude for the dynamic gain amplifier 114 to the effective amplitude of the test signal. Once the static gain and the target amplitude are set, the control unit 110 may enable the dynamic gain adjustment via the dynamic gain amplifier 114 with the dynamic gain set to the predetermined fixed gain.

After the dynamic gain adjustment is enabled, the dynamic gain amplifier 114 maintains an amplitude of a dynamic gain amplified signal at an output of the dynamic gain amplifier 114 at the target amplitude by varying the dynamic gain about the predetermined fixed gain. Because the predetermined fixed gain is set to the middle value of the dynamic gain range, the dynamic gain can be varied through the full dynamic gain range during the run time of the receiver 100 to compensate for signal variations. Because the dynamic gain amplifier 114 has the full dynamic gain range available to compensate for signal variations, the receiver's capacity to withstand temperature variations also increases. This results in increased thermal headroom for the receiver 100. In some examples, with the setting of the dynamic gain to the middle value of the dynamic gain range, the thermal headroom for the receiver 100 may increase by up-to about 30 degrees C. with a less than 0.3 order of magnitude increase in bit error rate.

Figure 2:
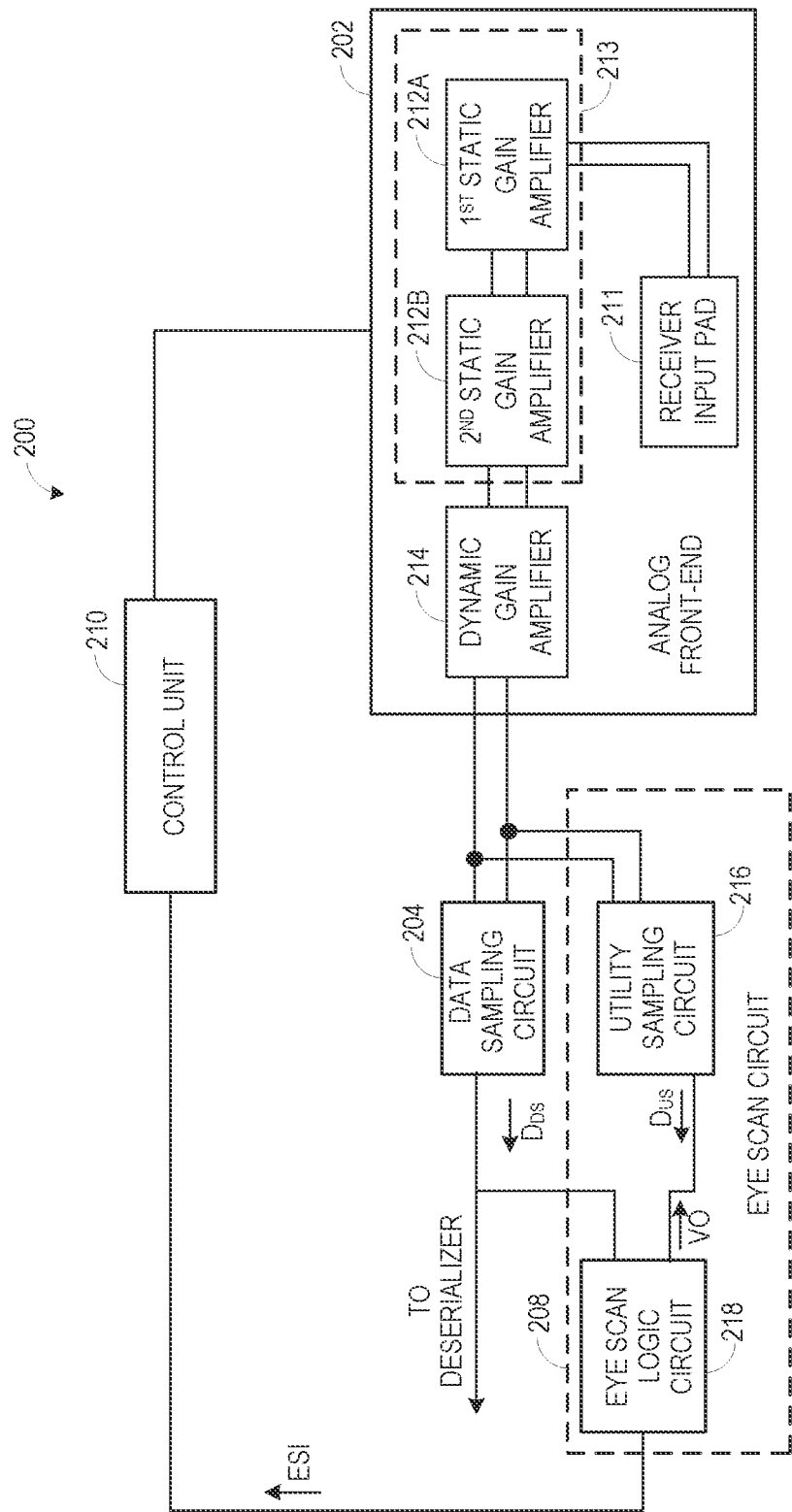
FIG. 2 is a block diagram of another example receiver.

Referring now to FIG. 2, a block diagram of another example receiver 200 is depicted. The receiver 200 of FIG. 2 may be an example representative of the receiver 100 of FIG. 1 and includes one or more components that are similar to those described in conjunction with the receiver 100 of FIG. 1, a description of which is not repeated herein. For example, the receiver 200 includes an AFE 202, a data sampling circuit 204, an eye scan circuit 208, and a control unit 210 that are example representatives of the AFE 102, the data sampling circuit 104, the eye scan circuit 108, and the control unit 110 of FIG. 1. In particular, FIG. 2 depicts certain circuits that form the AFE 202 and the eye scan circuit 208.

In the example implementation of FIG. 2, the AFE 202 is shown to include a receiver input pad 211, a static gain unit 213 including a plurality of static gain amplifiers such as a first static gain amplifier 212A and a second static gain amplifier 212B, and a dynamic gain amplifier 214. The AFE 202 may receive an input signal via a receiver input pad 211 from outside of the receiver 200. In case the receiver 200 is an optoelectronic receiver, the receiver input pad 211 may include a photodetector comprising one or more photodiodes to detect light that is transmitted over an optical communication link (not shown), such as a fiber optic cable, to the receiver 200. The photodetector converts the optical signal into an electrical signal which may be referred to as an input signal, in one example. In case the receiver 200 is an electronic receiver, the receiver input pad 211 may include electrical connectors to couple an external electronic circuit, for example, an electronic transmitter, to the first static gain amplifier 212A. Accordingly, the first static gain amplifier 212A receives the electrical signal (e.g., voltage or current signal) from the external electronic circuit. The input signal may be a multi-level PAM signal (e.g., PAM4 signal)

As can be seen in FIG. 2, the AFE 202 includes two stages of static gain amplification using the static gain amplifiers 212A and 212B. The static gain amplifiers 212A and 212B are example representatives of the static gain amplifier 112 of FIG. 1 and may include signal amplifiers using operational amplifiers, a circuit combination of one or more types of electronic devices to provide gain to the received input signal. In one example, the first static gain amplifier 212A may be configured to provide the highest gain among the static gain amplifiers 212A, 212B, and the dynamic gain amplifier 214, however with reduced resolution in comparison to the static gain amplifier 212B and the dynamic gain amplifier 214.

During operation, the first static gain amplifier 212A may receive the input signal from the receiver input pad 211 and amplify the input signal by providing a first static gain. The signal available at the output of the first static gain amplifier 212A is hereinafter referred to as a first static gain amplified signal. A magnitude of the first static gain may be controlled by the control unit 210 by sending a digital variable (e.g., 3-bit binary-encoded value) as an SGCI to the first static gain amplifier 212A. The first static gain may be set to a value in a first static gain range, for example, 0 dB to 64 dB. Accordingly, using the 3-bit binary-encoded value as the SGCI, the first static gain can be varied in eight discrete steps. In one example, upon powering on or resetting the receiver 200, the first static gain may be set to a first baseline static gain magnitude which may be in the middle of the first static gain range (e.g., a magnitude of 32 dB) by supplying the digital variable 100 as SGCI to the first static gain amplifier 212A.

The second static gain amplifier 212B may be coupled in series with the first static gain amplifier 212A to receive the first static gain amplified signal and further amplify the same to generate a second static gain amplified signal. In some examples, the second static gain amplifier 212B may be configured to provide lower gain with increased resolution as compared to the first static gain amplifier 212B. During operation of the receiver 200, the purpose of using the second static gain amplifier 212B is to get the overall signal amplitude close to the desired level (e.g., target amplitude that is set during the training phase), so that the dynamic gain amplifier 214 needs reduced variations in the dynamic gain.

The control unit 210 may control a magnitude of a static gain (hereinafter referred to as a second static gain) provided by the second static gain amplifier 212A by supplying a digital variable as an SGCI to the second static gain amplifier 212B. In some examples, the range of second static gain (hereinafter referred to as second static gain range) may be from 0 dB to 32 dB and the second static gain amplifier 212B is configured to accept a 5-bit binary-encoded value as the SGCI. Accordingly, the second static gain amplifier 212B may be varied in 32 discrete steps resulting in an increased resolution and finer control of gain compared to the first static gain amplifier 212A. In one example, upon powering on or resetting the receiver 200, the second static gain may be set to a second baseline static gain magnitude which may be a middle value of the second static gain range (e.g., a magnitude of 16 dB) by supplying the digital variable 10000 as SGCI to the second static gain amplifier 212B.

The dynamic gain amplifier 214 may be an example representative of the dynamic gain amplifier 114 and is coupled to an output of the second static gain amplifier 212B to receive the second static gain amplified signal. The dynamic gain amplifier 214 is configured to provide finer control of gain as compared to the static gain amplifiers 212A and 212B. A magnitude of the dynamic gain provided by the dynamic gain amplifier 214 may be controlled by the control unit 210 by supplying a digital control value to the dynamic gain amplifier 214. In one example, the digital control value supplied to the dynamic gain amplifier 214 as the DGCI may be an 8-bit binary-encoded value and the dynamic gain range of the dynamic gain amplifier 214 may be 0 dB to 16 dB. Accordingly, that dynamic gain may be varied in 256 discrete settings. For example, a maximum dynamic gain magnitude of 16 dB may be controlled through 256 smaller discrete steps resulting in the finest control of gain compared to the static gain amplifiers 212A-212B.

Although not shown in FIG. 2, in some examples, the receiver 200 may also include additional circuitry including, but not limited to, a continuous-time linear equalizer and decision feedback equalizer. The continuous-time linear equalizer may be coupled between the static gain amplifiers 212A and 212B, in some examples, to compensate for signal distortion caused by frequency-dependent attenuation through a communication channel (not shown) via which the receiver 200 receives signals. The decision feedback equalizer may be connected between the output of the dynamic gain amplifier 214 and inputs of the data sampling circuit 204 and the eye scan circuit 208 to compensate for signal distortions.

In some examples, the data sampling circuit 204 and the eye scan circuit 208 are coupled to the AFE 202 and receive an AFE output voltage (e.g., an output voltage of the dynamic gain amplifier 214). In one example implementation, the data sampling circuit 204 is configured to apply decision logic to the AFE output voltage to generate a first data stream (Dos). For example, the data sampling circuit 204 may compare a magnitude of the AFE output voltage with a configurable voltage threshold at a configurable sample time. The sample time may be set based on a clock signal (not shown). The first data stream is a stream of symbols (e.g., from 00, 01, 10, or 11 in the case of PAM4 data signal) as a received bit sequence. In some examples, the first data stream may be supplied to a deserializer circuit (not shown) for deserializing the data symbols into a plurality of data streams.

Figure 3:
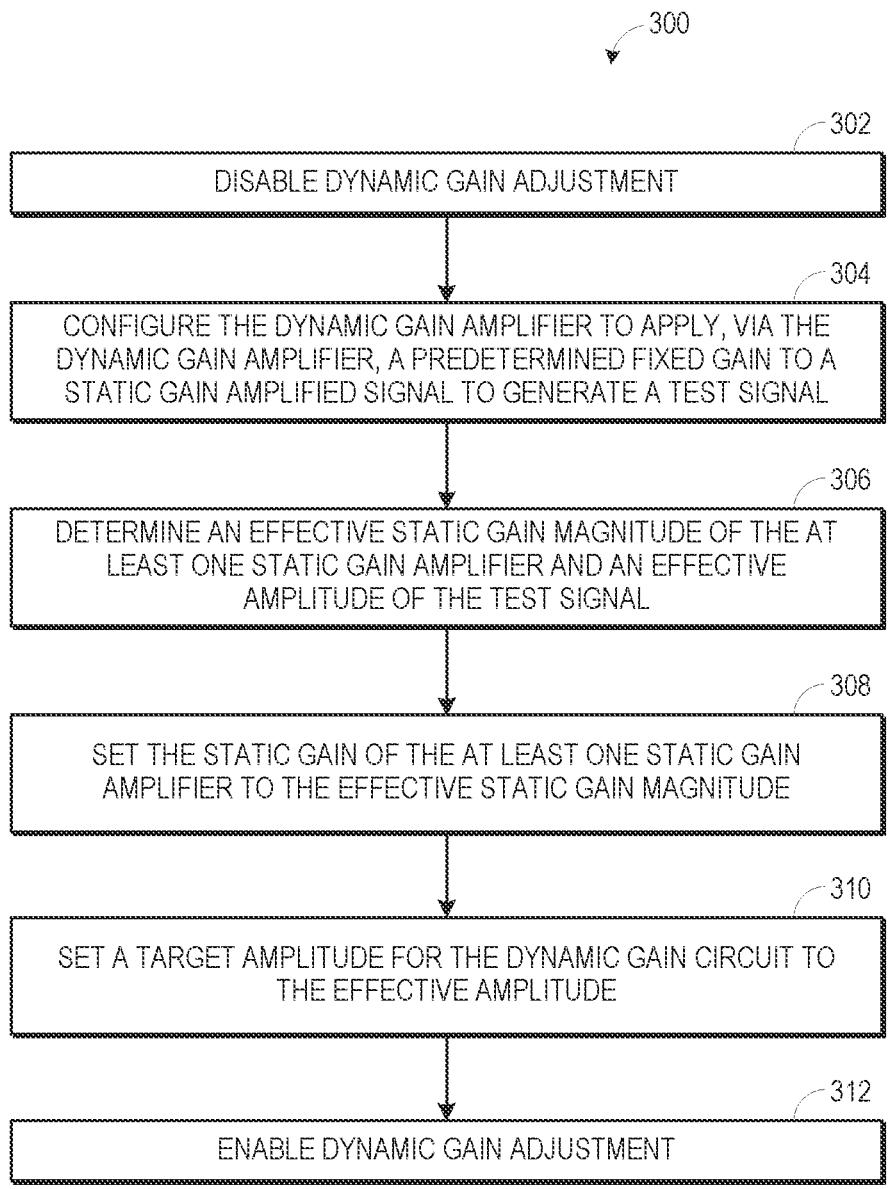
FIG. 3 is a flow diagram of an example method for configuring a static gain of at least one static gain amplifier and a target amplitude for a dynamic gain amplifier of an example receiver.

The eye scan circuit 208 may also include one or more circuits, for example, a utility sampling circuit 216 and an eye scan logic circuit 218 to generate eye scan information. In some examples, the eye scan logic circuit 218 utilizes the data sampling circuit 204 and the utility sampling circuit 216 to generate the eye scan information. The utility sampling circuit 216 is coupled in parallel with the data sampling circuit 204 to receive the AFE output voltage and is configured to output a second data stream ($D_{US}$). The utility sampling circuit 216 is controllable so as to use different voltage thresholds from the data sampling circuit 204. For example, the utility sampling circuit 216 may use a common sample time but apply a positive or negative voltage offset. In the example of FIG. 3, voltage thresholds used by the data sampling circuit 204 may be fixed to predetermined values, for example, to initially-calibrated voltage thresholds whereas the voltage thresholds for the utility sampling circuit 216 is variable. In this example, an eye scan as performed by the eye scan logic circuit 218 comprises applying a positive or negative voltage offset (VO) to the voltage thresholds of the utility sampling circuit 216. After a particular voltage offset is applied by the utility sampling circuit 216, the eye scan logic circuit 218 compares the second data stream obtained using the utility sampling circuit 216 to the first data stream obtained using the data sampling circuit 204.

The eye scan logic circuit 218 is coupled to both the data sampling circuit 204 and the utility sampling circuit 216 The eye scan logic circuit 218 receives the first data stream and the second data stream from the data sampling circuit 204 and the utility sampling circuit 216, respectively. Based on the first data stream and the second data stream, and/or internal signals generated inside the data sampling circuit 204 and the utility sampling circuit 216, the eye scan logic circuit 218 may generate the eye scan information that represents a distribution of the probability of a signal (e.g., the AFE output voltage) having given voltage value at a given phase offset. In some implementations, the receiver 200 may include a clock data recovery circuit (not shown) that generates a periodic clock signal that has the same period as the received signal (e.g., the test signal) and is aligned to the middle of the UI. The data sampling circuit 204 may be configured to sample incoming signal (e.g., the AFE output voltage) on edge of the clock signal (also referred to as a recovered clock edge). To perform the eye scan, the eye scan logic circuit 218 may configure the utility sampling circuit 216 to sample the input signal (e.g., the test signal) at a time up to half the UI before or after this recovered clock edge. In particular, the phase offset may refer to a difference between the recovered clock edge and the time when the signal is sampled. In some examples, the eye scan information generated by the eye scan circuit 208 may be used by the control unit 210 to calculate the link performance metric (see FIG. 5).

The control unit 210 may be an example representative of the control unit 110 and is coupled to the static gain unit 213 and the dynamic gain amplifier 214. The control unit 210 is configured to execute a receiver training program code to set the static gains of the static gain amplifiers 212A-212B and the target amplitude for the dynamic gain amplifier 214 such that the link performance metric is at a target performance value. In particular, the control unit 210 may adjust the static gains of the static gain amplifiers 212A-212B and set the target amplitude for the AFE output voltage such that the link performance metric attains a maximum value resulting in minimum BER. Details of calculating the link performance metric are described in conjunction with FIG. 5.

As described with reference to FIG. 1, the control unit 210 of FIG. 2 may also execute a training phase in which the first static gain, the second static gain, and a target amplitude for the dynamic gain amplifier may be set. The first static gain amplifier 212A may amplify an input signal (e.g., a PAM4 voltage signal with a predefined sequence of one or more of the four levels) to generate the first static gain amplified signal. The first static gain amplified signal is again amplified by the second static gain amplifier 212B thereby generating the second static gain amplified signal.

During the training phase, the control unit 210 may first disable a dynamic gain adjustment via the dynamic gain amplifier 214 and then configure the dynamic gain amplifier 214 to apply, via the dynamic gain amplifier 214, a predetermined fixed gain to the received second static gain amplified signal. Accordingly, the dynamic gain amplifier 214 provides a fixed gain (e.g., the predetermined fixed gain) to the received second static gain amplified signal thereby generating a test signal. In one example, the predetermined fixed gain may be the same as the baseline dynamic gain.

Further, after the dynamic gain adjustment is disabled and the dynamic gain amplifier 214 is configured to provide fixed gain, the control unit 210 may determine effective static gain magnitudes for each of the static gain amplifiers 212A, 212B and an effective amplitude of the test signal for which a link performance metric of the receiver 200 is identified to be at the target performance value. To determine the effective static gain magnitude and the effective amplitude of the test signal, the control unit 210 may sweep the static gains of the plurality of static gain amplifiers 212A, 212B through respective static gain ranges (e.g., the first static gain range and the second static gain range). For example, for a given duration, the first static gain may be set to a value from the first static gain range and the second static gain may be set to a value from the second static gain range. Further, for each combination of such static gain magnitudes, the control unit 210 may determine the link performance metric and measure the amplitude of the dynamic gain amplified signal. Further, the control unit 210 may compare the link performance metric with the target performance value. Likewise, the control unit 210 may set the first static gain and the second static gain to several combinations of values from the first static gain range and the second static gain range, respectively. The control unit 210 may register an amplitude of the test signal and a combination of static gain magnitudes for which the link performance metric matches with the target performance value as the effective amplitude and the effective static gain magnitudes, respectively.

Further, the control unit 210 sets the static gains (e.g., the first static gain and the second static gain) of the plurality of static gain amplifiers 212A and 212B to respective effective static gain magnitudes, and a target amplitude for the dynamic gain amplifier to the effective amplitude of the test signal. Setting the static gains of the static gain amplifiers 212A, 212B to the respective static gain magnitudes may result in reduced signal distortions and ensure linearity of signals through the AFE 202. Once the static gains and the target amplitude are set, the control unit 210 may enable the dynamic gain adjustment via the dynamic gain amplifier 214. Accordingly, the dynamic gain amplifier 214 varies its gain to maintain an amplitude of the dynamic gain amplified signal at the target amplitude. As the dynamic gain amplifier 214 maintains its gain mostly around the predetermined fixed gain, the thermal headroom for the receiver 200 may be maintained resulting in improved thermal performance of the receiver. Also, as the static gain of the static gain amplifiers is set to achieve a desired link performance metric, the signal distortions may be limited resulting in reduced BER.

Figure 4:
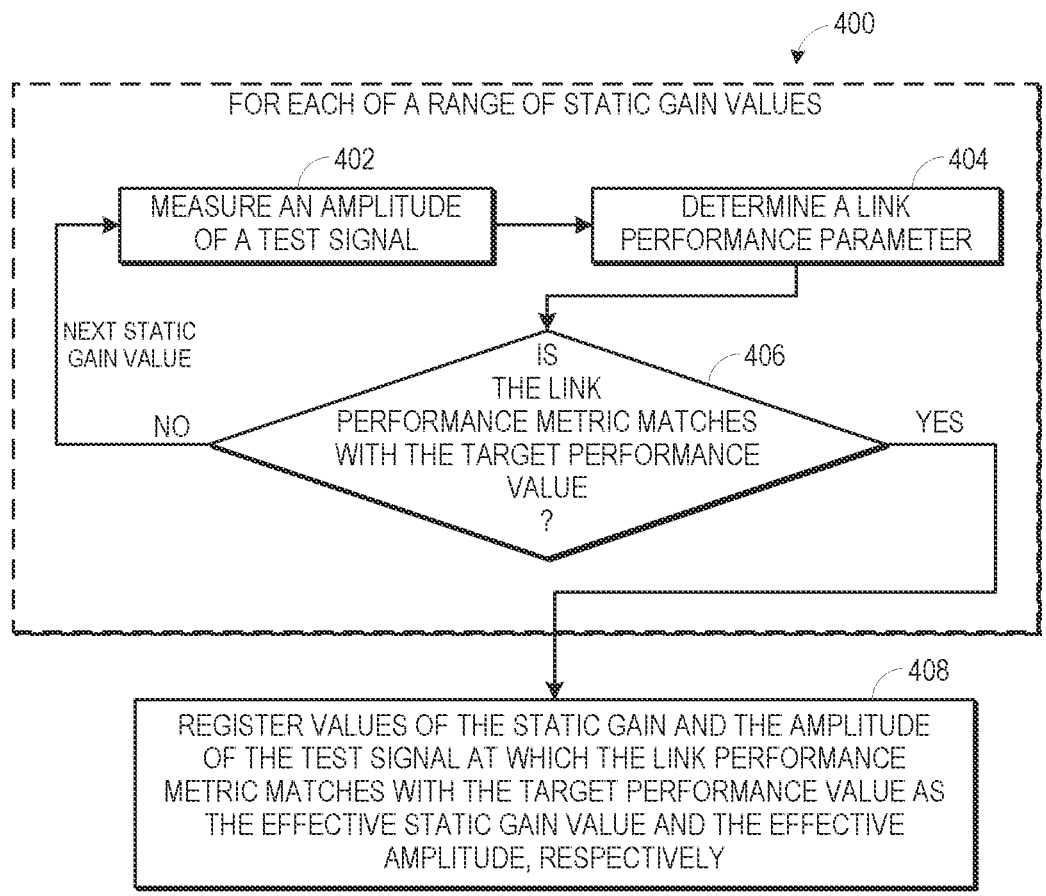
FIG. 4 is a flow diagram of an example method for determining the static gain of at least one static gain amplifier and a target amplitude for a dynamic gain amplifier of an example receiver.
Figure 5:
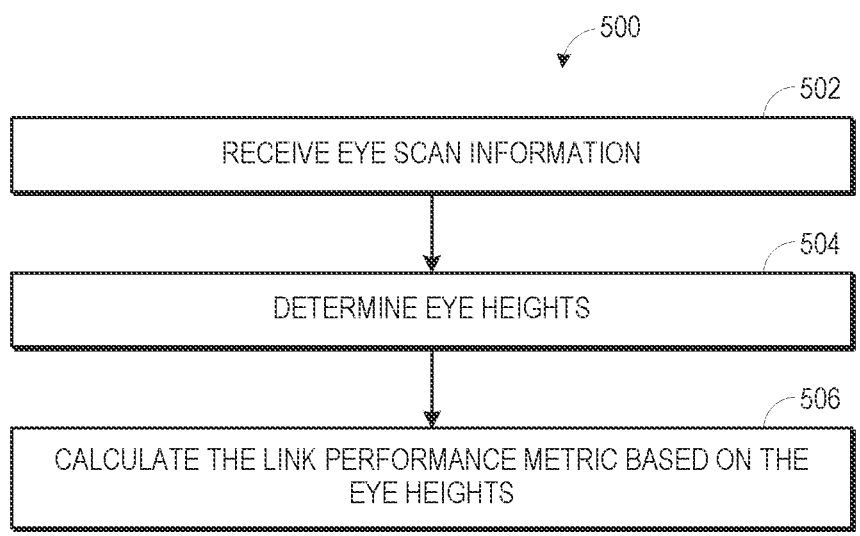
FIG. 5 is a flow diagram of an example method for determining a link performance metric for an example receiver.

In the description hereinafter, several operations performed by the control unit 110 will be described with help of flow diagrams depicted in FIGS. 3-5. For illustration purposes, the flow diagrams, depicted in FIGS. 3-5, are described in conjunction with the receiver 100 of FIG. 1, however, the methods of FIGS. 3-5 should not be construed to be limited to the example configuration of the receiver 100. For example, the methods of FIGS. 3-5 may also apply to the receiver 200 and may be performed by the control unit 210. Also, the methods described in FIGS. 3-5 may represent an example logical flow of some of the several operations performed by the control unit 110. However, in some other examples, the order of execution of the blocks depicted in FIGS. 3-5 may be different than the order shown. The operations at various blocks may be performed in series, in parallel, or in a series-parallel combination. By way of example, the method blocks 302 and 304 in FIG. 3 may be performed in parallel.

Referring now to FIG. 3, a flow diagram of an example receiver training method 300 for configuring a static gain of at least one static gain amplifier (e.g., the static gain amplifier 112) and a target amplitude for a dynamic gain amplifier (e.g., the dynamic gain amplifier 114) of a receiver such as the receiver 100 is presented. The method 300 may be performed during a training phase of the receiver 100 upon execution of a receiver training program by the control unit 110. In particular, in one example, the training phase may commence upon powering on or resetting the receiver 100. In some examples, to perform the method 300, the receiver 100, when powered-on/reset, may be supplied with a training signal as an input signal at a predetermined data rate, for example, 28 gigabits per second (Gbps) to 56 Gbps for a PAM4 signal. The static gain amplifier 112 may amplify the training signal to generate a static gain amplified signal by applying a static gain (which is the baseline static gain when the receiver 100 is powered on/reset) to the training signal. The static gain amplified signal is received by the dynamic gain amplifier 114.

To further adjust the static gain of the static gain amplifier 112, at block 302, the control unit 110 may disable a dynamic gain adjustment via the dynamic gain amplifier 114. The control unit 110 may send a dynamic gain disable command to the dynamic gain amplifier 114 to stop the dynamic gain amplifier 114 from varying its gain. Further, at block 304, the control unit 110 may configure the dynamic gain amplifier 114 to apply, via the dynamic gain amplifier 114, a predetermined fixed gain to the static gain amplified signal to generate a test signal. In one example, the control unit may send a control signal comprising the DGCI to the dynamic gain amplifier 114. The DGCI may include a value indicative of the predetermined fixed gain which may be in the dynamic gain range of the dynamic gain amplifier 114. In one example, the predetermined fixed gain may be set to the baseline dynamic gain. In another example, the predetermined fixed gain may be set to any value other than the baseline dynamic gain. When the dynamic gain adjustment is disabled, the dynamic gain amplifier 114 provides a fixed gain (e.g., the predetermined fixed gain) to the received static gain amplified signal thereby generating a test signal.

Further, at block 306, the control unit 110 may determine an effective static gain magnitude for the static gain amplifier 112 and an effective amplitude of the test signal. The effective static gain magnitude and the effective amplitude are the values of the static gain and the amplitude of the test signal for which a link performance metric of the receiver 100 is identified to be at a target performance value. In one example, the effective static gain and the effective amplitude for the test signal are observed when the link performance metric is determined to be maximum. An example method of determining the effective static gain magnitude and the effective amplitude of the test signal is described in conjunction with FIG. 4. The control unit 110 may determine the link performance metric based on the eye scan information generated by the eye scan circuit 108. An example method of determining the link performance metric is described in conjunction with FIG. 5.

At block 308, the control unit 110 may set the static gain of the static gain amplifier 112 to the effective static gain magnitude. The control unit 110 may send a control signal comprising the SGCI to the static gain amplifier 112. At block 308, the SGCI in the control signal may include the effective static gain magnitude that is determined at block 306. After the static gain amplifier 112 is configured with the effective static gain magnitude, the static gain amplifier 112 provides a fixed gain at the effective static gain magnitude to an input signal during operation after the training phase is over.

Further, at block 310, the control unit 110 may set a target amplitude for the dynamic gain amplifier 114 to the effective amplitude of the test signal. To set the target amplitude for the dynamic gain amplifier 114, the control unit 110 may send a control signal comprising the effective amplitude determined at block 306 to the dynamic gain amplifier 114.

After the static gain amplifier 112 is configured with the effective static gain magnitude, the control unit 110, at block 312, may enable the dynamic gain adjustment via the dynamic gain amplifier 114. In some examples, the control unit 110 may send a dynamic gain enable command to the dynamic gain amplifier 114 to enable the dynamic gain amplifier 114 to vary its gain to maintain the amplitude of the dynamic gain amplified signal at an output of the dynamic gain amplifier 114 at the target amplitude by varying the dynamic gain.

Moving to FIG. 4, a method 400 for determining the effective static gain of the static gain amplifier 112 and the target amplitude for the dynamic gain amplifier 114 is presented. To determine the effective static gain magnitude and the effective amplitude of the test signal, the control unit 110 may sweep the static gain through one or more values from the static gain range. For example, for each set static gain magnitude of the static gain range, at block 402, the control unit 110 may measure the amplitude of the test signal via the dynamic gain amplifier 114. Also, for each set static gain magnitude of the static gain range, at block 404, the control unit 110 may determine the link performance metric based on the eye scan information generated by the eye scan circuit, such as, the eye scan circuit 108. Details of determining the link performance metric are described in conjunction with FIG. 5.

Further, at block 406, the control unit 110 may perform a check to determine whether the link performance metric matches a target performance value. In one example, the target performance value may be a customizable value that may be set in accordance with desired performance (e.g., BER) of the receiver 100. In another example, the target performance value may be a maximum achievable value of the link performance metric. Accordingly, in one example, performing the check at block 406 may include comparing the link performance metric with the target performance value and determining that the link performance metric matches the target performance value if the performance metric is equal to the target performance value. In another example, performing the check at block 406 may include comparing the link with the performance metric with the target performance value and determining that the link performance metric matches the target performance value if the performance metric is within a predetermined range from the target performance value. In yet another example, performing the check at block 406 may include determining that the link performance metric matches the target performance value if the link performance metric has attained the maximum achievable value.

At block 406, if it is determined that the link performance metric does not match with the target performance value, the control unit 110 may set the static gain of the static gain amplifier 112 to another value from the static gain range and execute operations at block 402 and 404 again. However, at block 406, if it is determined that the link performance metric matched with the target performance value, the control unit 110, at block 408, may register (e.g., store) the values of the static gain and the amplitude of the test signal for which the link performance metric matched with the target performance value as the effective static gain magnitude and the effective amplitude, respectively.

Figure 6:
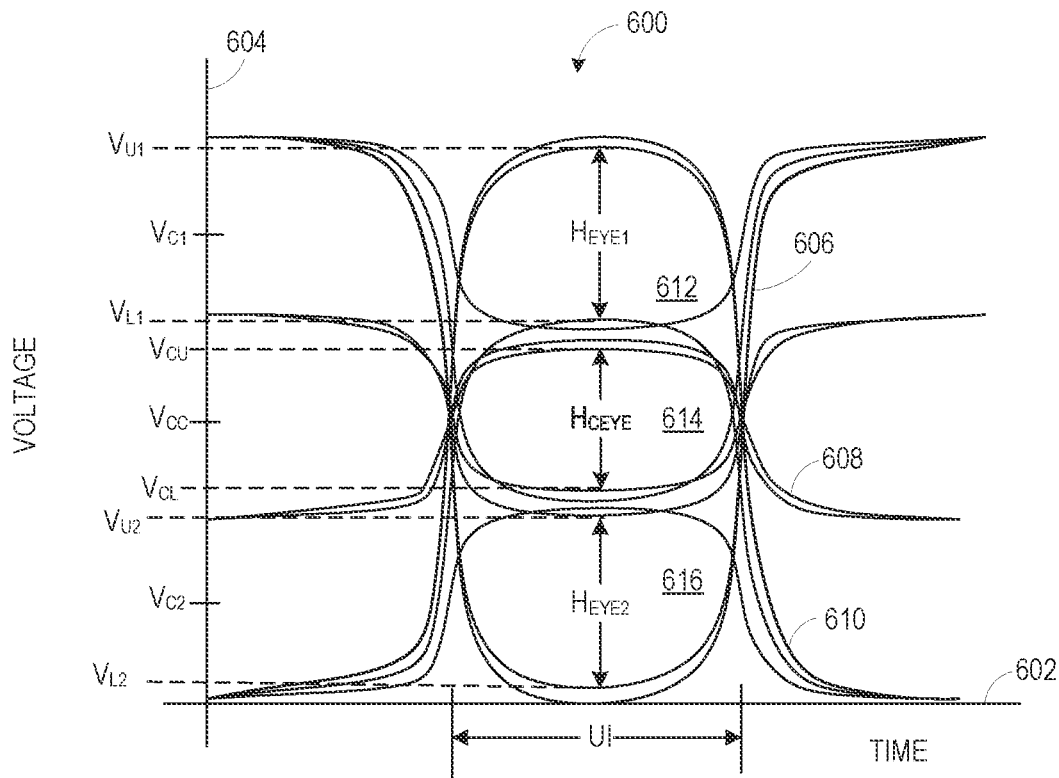
FIG. 6 is a graphical representation depicting an example eye diagram for an example receiver.

Referring now to FIG. 5, a flow diagram of an example method 500 for determining a link performance metric is presented. In one example, the method 500 may represent a set of operations that are performed to execute the method at block 404 of FIG. 4. At block 502, the control unit 110 may receive the eye scan information generated by the eye scan circuit 108. The eye scan information may be represented in the form of an eye diagram (see FIG. 6). For ease of illustration, FIG. 6 is described and referred to concurrently with FIG. 5. In particular, the eye diagram is a graphical representation of the eye scan information for illustration purposes. In the eye diagram 600, the X-axis 602 represents time measured in UI, and the Y-axis 604 represents voltage levels. The wave lines 606, 608, and 610 (although there are many, only three wave lines are labeled for illustration purposes) represent how the PAM4 data signals are received, for example, as a result of repetitively sampling the received PAM4 data signals comprising a random sequence of symbols 00, 01, 10, and 11. As may be seen, the originally rectangular waveforms are "smeared" by the channel effects to become more saw-tooth-like. The region between the two or more of the wave lines 606, 608, and 610 in the UI are referred to as eyes. In the eye diagram 600, three eyes such as a first outer eye 612, a center eye 614, and a second outer eye 616 can be seen because the input signal is PAM4 encoded data signal.

Referring back to the method 500, at block 504, the control unit 110 may determine eye heights based on the eye scan information. The explanation of how the eye heights are determined hereinafter is for illustration purposes. Other techniques of determining the eye heights may also be implemented by the control unit 110, without limiting the scope of the present disclosure. The term eye height may refer to a maximum vertical opening measured as a voltage range on the Y-axis 604 for a given eye. For example, at block 504, the control unit 110 may determine an eye height of each of the three eyes 612-616.

To determine the eye height for a given eye, the control unit 110, may identify the voltage level above and below a center voltage (e.g., sampling threshold) of the given eye where the probability of the signal being sampled at that voltage is greater than a predetermined value. Then, the control unit 110 may determine the height of the given eye as a difference between these two voltages. By way of example, for the first outer eye 612, the control unit 110 may identify a first outer eye upper voltage ($V_{U1}$) and a first outer eye lower voltage ($V_{L1}$) as the voltage levels above and below a center voltage ($V_{C1}$) of the first outer eye 612 (hereinafter referred to as a first eye center voltage). In particular, a voltage level, above the center voltage, at which the probability of the test signal being greater than the predetermined threshold is identified as the first outer eye upper voltage. Similarly, a voltage level, below the first eye center voltage, at which the probability of the test signal being greater than the predetermined threshold is identified as the first outer eye lower voltage. The first eye center voltage may be equal to a sampling threshold corresponding to the first outer eye 612. The control unit 110 may determine the height of the first outer eye 612 (hereinafter referred to as first height $H_{EYE1}$) as a difference between voltages $V_{U1}$ and $V_{L1}$ according to the relationship of equation (1).

$$H_{EYE1} = V_{U1} - V_{L1} \tag{1}$$

In another example, the first eye height may be determined based on a standard deviation ($\sigma$) of voltage values at each of $V_{U1}$ and $V_{L1}$ according to the relationship of equation (2).

$$H_{EYE1} = (V_{U1} - 3\sigma) - (V_{L1} + 3\sigma) \tag{2}$$

Similarly, for the second outer eye 616, the control unit 110 may identify a second outer eye upper voltage ($V_{U2}$) and a second outer eye lower voltage ($V_{L2}$) as the voltage levels above and below a center voltage ($V_{C2}$) of the second outer eye 616 (hereinafter referred to as a second eye center voltage). The second eye center voltage may be equal to a sampling threshold corresponding to the second outer eye 616. In particular, a voltage level, above the second eye center voltage, at which the probability of the test signal being sampled being greater than the predetermined threshold is identified as second outer eye upper voltage. Similarly, a voltage level, below the second eye center voltage, at which the probability of the test signal being sampled being greater than the predetermined threshold is identified as second outer eye lower voltage. The control unit 110 may determine the height of the second outer eye 616 (hereinafter referred to as second height $H_{EYE2}$) as a difference between voltages $V_{U2}$ and $V_{L2}$ according to the relationship of equation (3).

$$H_{EYE2}=V_{U2}-V_{L2} \qquad (3)$$

In another example, the second eye height may be determined based on a standard deviation ($\sigma$) of voltage values at each of $V_{U2}$ and $V_{L2}$ according to the relationship of equation (4).

$$H_{EYE2}=(V_{U2}-3\sigma)-(V_{L2}+3\sigma) \qquad (4)$$

Likewise, for the center eye 614, the control unit 110 may identify a center outer eye upper voltage ($V_{CU}$) and a center outer eye lower voltage ($V_{CL}$) as the voltage levels above and below a center voltage ($V_{CC}$) of the center eye 614 (hereinafter referred to as a center eye center voltage). The center eye center voltage may be equal to a sampling threshold corresponding to the center eye 614. In particular, a voltage level, above the center eye center voltage, at which the probability of the test signal being sampled being greater than the predetermined threshold is identified as center outer eye upper voltage. Similarly, a voltage level, below the center eye center voltage, at which the probability of the test signal being sampled being greater than the predetermined threshold is identified as center outer eye lower voltage. The control unit 110 may determine the height of the center eye 614 (hereinafter referred to as center height $H_{CEYE}$) as a difference between voltages $V_{CU}$ and $V_{CL}$ according to the relationship of equation (5).

$$H_{CEYE}=V_{CU}-V_{CL} \qquad (5)$$

In another example, the center height may be determined based on a standard deviation ($\sigma$) of voltage values at each of $V_{CU}$ and $V_{CL}$ according to the relationship of equation (6).

$$H_{CEYE}=(V_{CU}-3\sigma)-(V_{CL}+3\sigma) \qquad (6)$$

At block 506, the control unit 110 may determine the link performance metric based on the eye heights. In one example, the link performance metric may be determined based on the eye heights $H_{EYE1}$, $H_{EYE2}$, $H_{CEYE}$ that are determined at block 504. Calculating the link performance metric at block 506 may include determining a weighted sum of the eye heights $H_{EYE1}$, $H_{EYE2}$, $H_{CEYE}$. In one example, the link performance metric (LPM) may be determined based on the relationship of the example equation (7).

$$LPM=W1*H_{EYE1}+WC*H_{CEYE}+W2*H_{EYE2} \qquad (7)$$

In equation (1), W1, W2, and WC respectively represent scaling weights assigned to the eyes 612, 616, and 614. In one example, the scaling weights W1, W2, and WC may be determined based on the eye heights $H_{EYE1}$, $H_{EYE2}$, $H_{CEYE}$, respectively. In some examples, the scaling weights W1, W2, and WC may be selected from a fixed set of values, e.g., 1, 3, and 5. In particular, in one example, an eye with the lowest height is assigned the largest scaling weight from the set of values, and an eye with the highest eye height may be assigned the smallest scaling weight from the set of values. In some other examples, the scaling weights W1, W2, and WC may be any type of numeric value. By way of example, if the values of eye heights $H_{EYE1}$, $H_{EYE2}$, $H_{CEYE}$ are 3 mV, 5 mV, and 8 mV, respectively, the control unit 110 may select W1, W2, and WC as 5, 3, and 1, respectively. Accordingly, the link performance metric (LPM) may be determined as 38. In one example, an increase in the link performance value corresponds to an increase in one or more of the eye heights $H_{EYE1}$, $H_{EYE2}$, $H_{CEYE}$. Increased eye heights indicate that the receiver 100 decodes data symbols more accurately hence resulting in reduced BER.

In case the eye heights $H_{EYE1}$, $H_{EYE2}$, $H_{CEYE}$ are the same, the control unit 110 may randomly select scaling weights W1, W2, and WC from the set of values. In another example, if the eye heights $H_{EYE1}$, $H_{EYE2}$, $H_{CEYE}$ are the same, the control unit 110 may assign the same value to the scaling weights W1, W2, and WC. In some other examples, the scaling weights W1, W2, and WC may be dynamically calculated based on the values of the eye heights $H_{EYE1}$, $H_{EYE2}$, $H_{CEYE}$.

Figure 7:
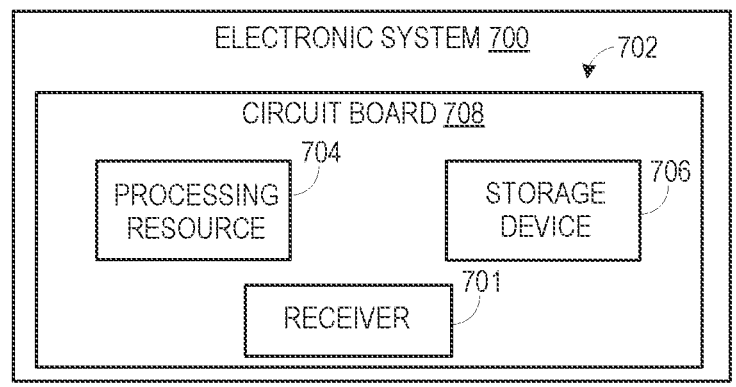
FIG. 7 is a block diagram of an example electronic system including an example receiver.

FIG. 7 is a block diagram of an example electronic system 700 including an example receiver 701. The electronic system 700 may include one or more multi-chip modules, for example, a multi-chip module (MCM) 702 to process and/or store data. In some examples, the MCM 702 may include a processing resource 704 and a storage medium 706 mounted on a circuit board 708. Also, in some examples, the MCM 702 may host the receiver 701 on the circuit board 708. In some other examples, one or more of the processing resource 704, the storage medium 706, and the receiver 701 may be hosted on a separate MCM (not shown). The circuit board 708 may be a printed circuit board (PCB) that includes several electrically conductive traces (not shown) to interconnect the processing resource 704, the storage medium 706, and the receiver 701 with each other and/or with other components disposed on or outside of the PCB.

The processing resource 704 may be a physical device, for example, one or more central processing units (CPUs), one or more semiconductor-based microprocessors, microcontrollers, one or more graphics processing unit (GPU), an ASIC, an FPGA, other hardware devices, or combinations thereof, capable of retrieving and executing the instructions stored in the storage medium 706. The processing resource 704 may fetch, decode, and execute the instructions stored in the storage medium 706. As an alternative or in addition to executing the instructions, the processing resource 704 may include at least one integrated circuit (IC), control logic, electronic circuits, or combinations thereof that include a number of electronic components. The storage medium 706 may be any electronic, magnetic, optical, or any other physical storage device that contains or stores instructions that are readable and executable by the processing resource 704. Thus, the storage medium 706 may be, for example, Random Access Memory (RAM), non-volatile RAM (NVRAM), an Electrically Erasable Programmable Read-Only Memory (EEPROM), a storage device, an optical disc, and the like. In some embodiments, the storage medium 706 may be a non-transitory storage medium, where the term "non-transitory" does not encompass transitory propagating signals. Further, in some examples, the receiver 701 may be any of the receivers 100 or 200.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A method comprising:
    disabling, by a control unit of a receiver, a dynamic gain adjustment via a dynamic gain amplifier of the receiver, wherein the receiver further comprises at least one static gain amplifier coupled to an input of the dynamic gain amplifier to generate a static gain amplified signal by applying a static gain to an input signal;
    configuring, by the control unit, the dynamic gain amplifier to apply, via the dynamic gain amplifier, a predetermined fixed gain to the static gain amplified signal to generate a test signal;
    determining, by the control unit, an effective static gain magnitude of the at least one static gain amplifier and an effective amplitude of the test signal for which a link performance metric of the receiver is identified to be at a target performance value;
    setting, by the control unit, the static gain of the at least one static gain amplifier to the effective static gain magnitude, and a target amplitude for the dynamic gain amplifier to the effective amplitude of the test signal; and
    enabling, by the control unit, the dynamic gain adjustment via the dynamic gain amplifier to maintain an amplitude of a dynamic gain amplified signal at an output of the dynamic gain amplifier at the target amplitude by varying a dynamic gain of the dynamic gain amplifier.

2. The method of claim 1, wherein determining the effective static gain magnitude and the effective amplitude comprises sweeping, by the control unit, the static gain of the at least one static gain amplifier through each of a range of static gain magnitudes.

3. The method of claim 2, wherein determining the effective static gain magnitude and the effective amplitude further comprises:
    for each static gain magnitude of the range of static gain magnitudes:
        determining, by the control unit, the link performance metric and the amplitude of the dynamic gain amplified signal; and
        comparing, by the control unit, the link performance metric with the target performance value.

4. The method of claim 3, wherein determining the effective static gain magnitude and the effective amplitude further comprises registering values of the static gain and the amplitude of the test signal for which the link performance metric matches with the target performance value as the effective static gain magnitude and the effective amplitude, respectively.

5. The method of claim 3, wherein the receiver comprises an eye scan circuit coupled to the dynamic gain amplifier to receive the test signal and generate eye scan information based on the test signal, wherein the eye scan information is representable as an eye diagram comprising three eyes.

6. The method of claim 5, wherein determining the link performance metric comprises:
    receiving, by the control unit, the eye scan information from the eye scan circuit;
    determining eye heights of the three eyes; and
    calculating the link performance metric based on the eye heights.

7. The method of claim 6, wherein calculating the link performance metric comprises determining a weighted sum of the eye heights.

8. The method of claim 1, wherein the receiver is hosted in a server.

9. A receiver comprising:
    a static gain unit comprising a plurality of static gain amplifiers coupled in series to generate a static gain amplified signal by applying respective static gains;
    a dynamic gain amplifier coupled to the static gain unit to receive the static gain amplified signal; and
    a control unit coupled to the static gain unit and the dynamic gain amplifier, wherein the control unit:
        disables a dynamic gain adjustment via the dynamic gain amplifier;
        configures the dynamic gain amplifier to apply, via the dynamic gain amplifier, a predetermined fixed gain to the static gain amplified signal to generate a test signal;
        determines effective static gain magnitudes of the plurality of static gain amplifiers and an effective amplitude of the test signal for which a link performance metric of the receiver is identified to be at a target performance value;
        sets the static gains of the plurality of static gain amplifiers to respective effective static gain magnitudes, and a target amplitude for the dynamic gain amplifier to the effective amplitude of the test signal; and
        enables the dynamic gain adjustment via the dynamic gain amplifier to maintain an amplitude of a dynamic gain amplified signal at an output of the dynamic gain amplifier at the target amplitude by varying a dynamic gain of the dynamic gain amplifier.

10. The receiver of claim 9, wherein for each combination of static gain magnitudes for the plurality of static gain amplifiers, the control unit:
determines the link performance metric and the amplitude of the dynamic gain amplified signal; and
compares the link performance metric with the target performance value.

11. The receiver of claim 10, wherein the control unit registers an amplitude of the test signal and a combination of static gain magnitudes for which the link performance metric matches with the target performance value as the effective amplitude and the effective static gain magnitudes, respectively.

12. The receiver of claim 9, wherein the receiver comprises an eye scan circuit coupled to the dynamic gain amplifier to receive the test signal and generate eye scan information based on the test signal, wherein the eye scan information is representable as an eye diagram comprising three eyes.

13. The receiver of claim 12, wherein the control unit:
receives the eye scan information from the eye scan circuit;
determines eye heights of the three eyes; and
calculates the link performance metric based on the eye heights.

14. The receiver of claim 9, wherein the predetermined fixed gain is set to a middle value in a dynamic gain range of the dynamic gain amplifier.

15. An electronic system comprising:
a circuit board;
a processing resource mounted on the circuit board;
a storage medium mounted on the circuit board and communicatively coupled to the processing resource; and
a receiver mounted on the circuit board and communicatively coupled to the processing resource, the receiver comprising:
a static gain amplifier to generate a static gain amplified signal by applying a static gain;
a dynamic gain amplifier coupled to the static gain amplifier to receive the static gain amplified signal; and
a control unit coupled to the static gain amplifier and the dynamic gain amplifier, wherein the control unit:
disables a dynamic gain adjustment via the dynamic gain amplifier;
configures the dynamic gain amplifier to apply, via the dynamic gain amplifier, a predetermined fixed gain to the static gain amplified signal to generate a test signal;
determines an effective static gain magnitude of the static gain amplifier and an effective amplitude of the test signal for which a link performance metric of the receiver is identified to be at a target performance value;
sets the static gain of the static gain amplifier to the effective static gain magnitude, and a target amplitude for the dynamic gain amplifier to the effective amplitude of the test signal; and
enables the dynamic gain adjustment via the dynamic gain amplifier to maintain an amplitude of a dynamic gain amplified signal at an output of the dynamic gain amplifier at the target amplitude by varying a dynamic gain of the dynamic gain amplifier around the predetermined fixed gain.

16. The electronic system of claim 15, wherein the receiver further comprises an eye scan circuit coupled to the dynamic gain amplifier to receive the test signal and generate eye scan information based on the test signal, wherein the eye scan information is representable as an eye diagram comprising three eyes.

17. The electronic system of claim 16, wherein the control unit:
receives the eye scan information from the eye scan circuit;
determines eye heights of the three eyes; and
calculates the link performance metric based on the eye heights.

18. The electronic system of claim 15, wherein the predetermined fixed gain is set to a middle value in a dynamic gain range of the dynamic gain amplifier or a value within a predetermined range from the middle value.

19. The electronic system of claim 18, wherein setting the static gain to the effective static gain magnitude and the target amplitude for the dynamic gain amplifier to the effective amplitude of the test signal increases thermal headroom by up-to 30 degrees C.

20. The electronic system of claim 18, wherein setting the static gain to the effective static gain magnitude and the target amplitude for the dynamic gain amplifier to the effective amplitude of the test signal limits an increase in a bit error rate within 0.3 order of magnitude.

* * * * *